US009596047B2

(12) United States Patent
Yang et al.

(10) Patent No.: US 9,596,047 B2
(45) Date of Patent: Mar. 14, 2017

(54) IMPLEMENT METHOD OF RESOURCE RESERVATION PROTOCOL WITH MULTI-SERVICES CONVERGENCE TRANSMISSION FOR OPTICAL BURST SWITCHING NETWORKS

(75) Inventors: Xiaolong Yang, Sichuan (CN); Keping Long, Sichuan (CN); Min Zhang, Sichuan (CN); Sheng Huang, Sichuan (CN)

(73) Assignee: University of Electronic Science and Technology of China, Chengdu, Sichuan (CN)

( * ) Notice: Subject to any disclaimer, the term of this patent is extended or adjusted under 35 U.S.C. 154(b) by 269 days.

(21) Appl. No.: 13/290,027

(22) Filed: Nov. 4, 2011

(65) Prior Publication Data

US 2012/0082452 A1   Apr. 5, 2012

(51) Int. Cl.
*H04J 14/00* (2006.01)
*H04J 14/02* (2006.01)
*H04L 12/911* (2013.01)

(52) U.S. Cl.
CPC .......... *H04J 14/0267* (2013.01); *H04L 47/72* (2013.01)

(58) Field of Classification Search
CPC . H04L 12/5695; H04L 47/72; H04Q 11/0001; H04Q 11/0066; H04J 14/0267
USPC .............................. 370/235, 351; 398/43, 45
See application file for complete search history.

(56) References Cited

U.S. PATENT DOCUMENTS

| | | | | |
|---|---|---|---|---|
| 7,561,800 | B2 * | 7/2009 | Ryu et al. | 398/54 |
| 7,620,049 | B2 * | 11/2009 | Den Hollander et al. | 370/392 |
| 7,630,363 | B2 * | 12/2009 | Den Hollander et al. | 370/375 |
| 7,720,379 | B2 * | 5/2010 | Handelman | 398/47 |
| 7,747,168 | B2 * | 6/2010 | Ryu | 398/52 |
| 2007/0177871 | A1 * | 8/2007 | Lee et al. | 398/45 |
| 2007/0189285 | A1 * | 8/2007 | Choi et al. | 370/389 |
| 2009/0110394 | A1 * | 4/2009 | Xu et al. | 398/45 |
| 2009/0142055 | A1 * | 6/2009 | Qiu et al. | 398/45 |
| 2010/0142942 | A1 * | 6/2010 | Rhee et al. | 398/25 |
| 2011/0125936 | A1 * | 5/2011 | Malleth et al. | 710/26 |
| 2013/0201826 | A1 * | 8/2013 | Testa et al. | 370/230 |

* cited by examiner

*Primary Examiner* — Paul H Masur (57) ABSTRACT

An implement method of reservation protocol with multi-services convergence transmission for OBS networks differentially processes the synchronous service flow and the asynchronous service flow, and assembles multiple different types service data into different data burst (DB) by generalized optical-burst paradigm. It functionally expands burst control packet (BCP) and classifies the BCP into two categories: routine burst control packet (R-BCP) and synchronous trace burst control packet (T-BCP). Then it can differentially reserve wavelength channel resource and preempt resource to try to keep the transmission features of synchronous service such as period, low delay jitter and low dropping probability on the base of ensuring the basic QoS requirements of various kinds of service, and realize that a single OBS network efficiently provides asynchronous service and synchronous service.

16 Claims, 5 Drawing Sheets

| packet header | BCP class | ingress port IN-PRT | synchronous burst train ID | DB sequence DB-SN | reserved chananl information | check CRC |
|---|---|---|---|---|---|---|

IMPLEMENT METHOD OF RESOURCE RESERVATION PROTOCOL WITH MULTI-SERVICES CONVERGENCE TRANSMISSION FOR OPTICAL BURST SWITCHING NETWORKS

CROSS-REFERENCE TO RELATED APPLICATIONS

The present application claims the foreign priority based on an application filed in China on May 5, 2010, No. 201010533897.6, the contents of which are incorporated hereinto by reference.

BACKGROUND OF THE PRESENT INVENTION

Field of Invention

The present invention relates to the field of telecommunication technology, and more particularly to an implement method of resource reservation protocol with multi-services convergence transmission for optical burst switching networks.

Description of Related Arts

Optical Burst Switching (OBS) is an optical switching technology whose switching granularity is between the optical circuit switching (OCS) and the optical packet switching (OPS). It treats an optical data burst as a switching unit. At the edge nodes, the data packets from the service layer are assembled into a data burst (DB) and a corresponding burst control packet (BCP) is produced. A BCP is sent to the downstream node before its corresponding DB for a preset offset time. And the wavelength channel resource is reserved for the DB. At the core node, after a BCP goes though the optical to electrical or the electrical to optical (O/E/O) conversion, the optical switching matrix is configured and the output wavelength channel is reserved. Therefore, a DB is transmitted to a destination node by all-optical. OBS combines the merits of OCS and OPS, overcomes that OCS lacks of flexibility because of its large switching granularity and that OPS gives hash demands on optical switching and buffer devices. Therefore, OBS will become the hi-speed core networking technology of future optical networks.

Though the classic signal control protocols of OBS such as just-in-time (JIT) and just-enough-time (JET) are improved and enhanced presently, they only support the asynchronous services (such as IP service and Ethernet service) and are not compatible with TDM services such as SDH/SONET, virtual circuit, and pseudo-wire emulation (PWE). How to efficiently support multi-services and meet the different quality of service (QoS) demands is the question that must be resolved for OBS networks.

With the emergence of MSTP and ASON, optical networks apparently have the evolutionary trend of supporting multi-services. Therefore, as the one of the core technologies of the future optical internet, the OBS technology must be evolved along the direction of supporting multi-services. But the classic OBS technology has many defects in the service provision paradigm, data delivery mechanism and signaling protocol, which result in a large gap between multi-services bearing capacity of the OBS technology and the different demands of multi-services.

SUMMARY OF THE PRESENT INVENTION

The present invention aims to resolve the problem that how to provide an implement method of resource reservation protocol with multi-services convergence transmission for OBS. In order to meet the future optical network demand that a single network bears multi-services, the method enhances the OBS capacity of the multi-services convergence transmission from the signaling protocol, and overcomes the shortcomings of the signaling protocols of the current OBS networks (such as JET, JIT). It can differentially schedule and preempt wavelength data channels for many different kinds of services. Based on ensuring the QoS requirements of various kinds of services, it tries to keep the transmission features of the synchronous service such as low delay jitter and low dropping probability, and realize that a single OBS network efficiently bears the asynchronous service and synchronous service.

To resolve the above problem, an implement method of resource reservation protocol with multi-services convergence transmission for OBS is proposed in the present invention, which comprises the following steps of:

(1) dividing user service data that arrive at OBS network ingress nodes into two categories: a synchronous service and an asynchronous service, wherein the user service data are assembled into three classes of DB, namely, a fully synchronous DB, a hybrid synchronous/asynchronous DB, and a fully asynchronous DB, wherein former two DBs are collectively referred to as a synchronous DB;

(2) defining and format-designing a routine BCP (R-BCP), a trace BCP (T-BCP) for implicitly notifying network nodes that a previously transmitted synchronous service flow has subsequent bursts, and a DB;

(3) at the edge nodes, making a generalized optical burst assembly that supports multi-services convergence transmission comprises the steps of:

(3.1) determining a DB assembly paradigm, wherein just as best effort services such as IP and Ethernet service, a light-path service and a TDM service also are assembled into a generalized DB, which is either a very long DB that occupies a total wavelength channel, or a certain periodic DB train whose DB length maybe the same, or may not be the same, wherein the light-path service data either don't need DB assembly or need simple DB assembly, wherein the TDM circuit service data may adopt a fixed assembly-period (FAP) algorithm, wherein the assembly period is the same as TDM slot, wherein when the light-path service or the TDM circuit service is assembled, if an assembly queue is empty or the data cannot fill up with a TDM slot, then the BE service data can be assembled into the DB;

(3.2) creating BCPs including R-BCP and T-BCP for implicitly notifying network nodes that the previously transmitted synchronous service flow has subsequent bursts, wherein when the best-effort service data such as IP and Ethernet is assembled into a fully-asynchronous DB, the assembly algorithm is a classic algorithm, this is to say, when a DB is assembled, a corresponding BCP, i.e., a R-BCP is created, wherein when TDM/PWE service data is assembled into a fully-synchronous DB or hybrid synchronous/asynchronous DB, the assembled DB has a period in order to keep transmission features of the synchronous service such as periodic, low delay jitter and low dropping probability, wherein logically a series of synchronous DBs that have the same destination, period and QoS character are referred to as a synchronous DB train, wherein in order to reduce an overhead of BCP process at the OBS core nodes, the assembly paradigm of the synchronous service is changed to create a R-BCP and multiple T-BCP of synchronous DB for a synchronous DB train (multiple synchronous DB);

(4) at the edge node, scheduling different class optical DBs by QoS differentiation, wherein the asynchronous DBs are individually scheduled by the classic algorithm such as LAUV-VF, FAFA-VF, ODBR, ABR and BM-VF-SBD, and for the synchronous DBs, a synchronous DB train is wholly scheduled by their period;

(5) making a resource reservation protocol with multi-services convergence transmission, wherein for the synchronous DB, an edge node sends a BCP that reserves the resource for a first DB of a corresponding DB train at the nodes of a transmission path, and in a service duration, the edge node periodically creates a T-BCP of synchronous DBs and sends them into the network, wherein after the resource reserved by the BCP of a synchronous DB train at the core node is used, it did not be released immediately and a timer is started to delay the release, wherein if the timer is timeout and the core node did not receive the T-BCP of a synchronous DB that has the same id as the synchronous DB whose resource is already reserved, the reserved resource is released, otherwise, when the core node receives a T-BCP, the reserved resource is keep, wherein the asynchronous DB is referred to as a special synchronous DB train (the DB train length is short and the number of the DB train is one) to reserve the resource; and (6) determining a policy for a resource competition among different class services, wherein a synchronous DB can preempt the resource of the asynchronous DB, namely, for two synchronous DBs, a long DB can preempt a short DB, for two fully-synchronous DBs or two asynchronous DBs, a high priority DB can preempt a low priority DB.

The present invention proposes an implement method of controlling signal and protocol with multi-services convergence transmission that is fit for OBS networks. The main idea of the method is introduced as follows. The user data such as the light path private line service, TDM circuit service, Ethernet frame, HDTV frame and IP packets are assembled into three classes of DBs by the generalized DB form: fully-synchronous DB, hybrid synchronous/asynchronous DB, and fully-asynchronous DB. For the synchronous DB, the wavelength channel resource is reserved for the DBs that belong to the same synchronous DB train by the paradigm of a reservation for repeated use. For the fully-asynchronous DB, the resource is independently reserved for a single DB and the resource is immediately released after use. When the resource collision occurs, the preset preempt policy is used to resolve the collision. Therefore, the method enables OBS networks to implement the object of a single network bearing multi-services.

These and other objectives, features, and advantages of the present invention will become apparent from the following detailed description, the accompanying drawings, and the appended claims.

BRIEF DESCRIPTION OF THE DRAWINGS

FIG. 2 is a format of a synchronous DB.

FIG. 3 is a format of R-BCP and T-BCP format.

DETAILED DESCRIPTION OF THE PREFERRED EMBODIMENT

Based on the conventional OBS signaling protocol, the present invention proposes an implement method with multi-services convergence transmission for OBS networks. From the view of function realization, the method comprises the function module designs of the edge node, and the definition and realization of the resource reservation protocol.

The function module design of an edge node comprises the two following parts:

(1) the design of the burst control packet (BCP) and data burst (DB) comprising the definition and design of the routine burst control packet (R-BCP), the trace burst control packet (T-BCP) that is used to implicitly notify the network node that the previously transmitted synchronous service flow has subsequent bursts, and the data burst (DB); and (2) the generalized optical burst assembly with the multi-services convergence transmission, wherein according to the demands of the user QoS and bandwidth granularity, various user data such as the light path private line, TDM circuit, Ethernet frame, HDTV frame and IP packet are assembled into the differently data-granularity generalized bursts such as sub-wavelength, wavelength and waveband granularity.

The definition and realization of the resource reservation protocol comprises the following parts:

(1) the agile and diverse resource reservation method, wherein according to the different classes of service, the agile and diverse resource method is provided, which can not only meet the transmission and switching demands of the periodic service and non-periodic service, but also reserve the various granularity data-channel resource such as sub-wavelength, wavelength, waveband and fiber, and can also reserve the resource by one-way and two-way, by open loop or close loop, by delay or immediacy; and (2) the design of the differentiated preemptive policy of wavelength channel, wherein when the reserving resource conflicts, a rational preemptive policy of the wavelength channel resource is used to ensure the QoS and service character of different class services.

Aiming at the technologic problems proposed by the present invention, the concrete resolution comprises the steps as follows.

(1) The user service data that arrive at the OBS network ingress nodes are classified two categories: synchronous service and asynchronous service. They are assembled into three classes of DB: a fully synchronous DB, a hybrid synchronous/asynchronous DB, and a fully asynchronous DB. The first two classes are collectively referred to as synchronous DB.

(2) R-BCP, T-BCP and DB are defined and their formats are designed.

(3) At the edge nodes, the generalized optical burst assembly that supports the multi-services convergence transmission comprises two steps as follows.

(3.1) DB assembly paradigm: just as best effort services such as IP and Ethernet service, the light-path service and TDM circuit service are also assembled into the generalized DBs. This sort of DB is either the very long DB that occupies the total wavelength channel, or the certain periodic DB train that the DB length either maybe the same, or may not be the same. The light-path service data either don't need the DB assembly or need the simple DB assembly. TDM circuit service data may adopt the fix assembly-period (FAP) algorithm. The assembly period is the same as TDM slot. When the light-path service or the TDM circuit service is assembled, if the assembly queue is empty or the data cannot fill up with a TDM slot, then BE service data can be assembled into the DB.

(3.2) BCPs including R-BCPs and T-BCPs are created. When best-effort service data such as IP and Ethernet are assembled into the fully-asynchronous DB, the assembly algorithm is a classic algorithm. This is to say, when a DB is assembled, a corresponding BCP, i.e., a R-BCP is created. When TDM/PWE service data are assembled into a fully-synchronous DB or hybrid synchronous/asynchronous DB, the assembled DB has a period in order to keep the transmission character of the synchronous service such as period, low delay jitter and low dropping probability. Logically a series of synchronous DBs that have the same destination, period and QoS character are referred to as a synchronous DB train. In order to reduce the overhead of the BCP process at the OBS core nodes, the assembly paradigm of the synchronous service is changed to create a R-BCP and multiple synchronous DB T-BCPs for a synchronous DB train (namely, multiple synchronous DBs).

(4) At the edge node, different class optical DBs are scheduled by QoS differentiation. The asynchronous DBs are individually scheduled by the classic algorithm such as LAUC-VF, FAFA-VF, ODBR, ABR and BM-VF-SBD. For the synchronous DBs, a synchronous DB train is wholly scheduled by their period.

(5) Resource reservation protocol with multi-services convergence transmission: For the synchronous DB, an edge node sends a BCP that reserves the resource for the first DB of the corresponding DB train at the nodes of the transmission path, and in the service duration, the edge node periodically creates a T-BCP of synchronous DBs and sends them into the network. After the resource reserved by the BCP of a synchronous DB train at the core node is used, it did not be released immediately and a timer is started to delay the release. If the timer is timeout and the core node did not receive the T-BCP of a synchronous DB that has the same id as the synchronous DB whose resource is already reserved, the reserved resource is released. Otherwise, when the core node receives a T-BCP, the reserved resource is kept. The asynchronous DB is referred to as a special synchronous DB train (namely, the DB train length is short and the number of the DB train is one) to reserve the resource.

(6) The policy for the resource competition among different class services is introduced as follows. A synchronous DB can preempt the resource of the asynchronous DB. For the two synchronous DBs, the long DB can preempt the short DB. For two fully-synchronous DBs or two asynchronous DBs, the high priority DB can preempt the low priority DB.

The present invention is further explained in detail with the accompanying drawings.

Figure 1:
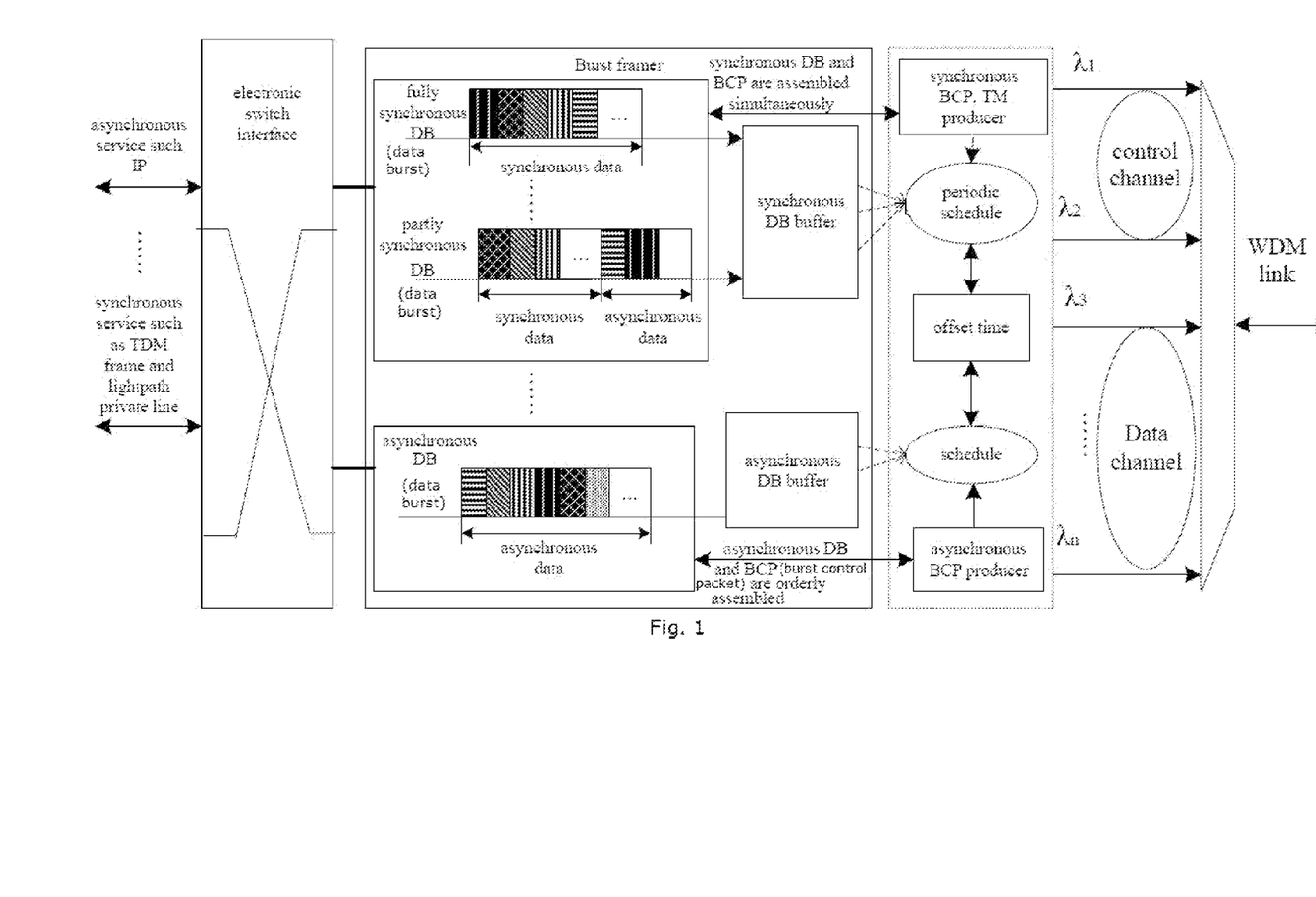
FIG. 1 is an edge node structure of the OBS networks with multi-services convergence transmission.

(1) The OBS network edge node structure with multi-services convergence transmission and the format design of DB The OBS network edge node structure with multi-services convergence transmission is shown in FIG. 1. A synchronous service arrives at the edge node by a fixed period. For the synchronous services such as the TDM circuit service, their sample frequency is 8 KHz and their frame length is 125 μs. Therefore, they are assembled into a synchronous burst every 125 μs. In the classic OBS networks, a DB is corresponding to a BCP, so for the TDM service, the switch control unit (SCU) deals with 8000 BCPs every second (namely, the optical switching unit is cross-connected configured for 8000 times every second. Therefore, a large overhead of signal and switch configuration is produced, and the network performance is seriously affected, especially when the synchronous burst is short (for example a voice service).

To solve the above problems and keep the periodical character of the services, edge nodes can use a paradigm that a train of synchronous DB is corresponding to a BCP. Many synchronous service data packets that have the equal period, destination and QoS attribute is orderly assembled into the synchronous DBs with the same length one after another by adopting the frame mapped generic framing procedure (GFP-F). The structure of a synchronous DB train may adopt a frame structure that is similar to the TDM service. This is to say, a burst in a DB train corresponds to a frame data of the TDM service. A frame in TDM contains some slots. Therefore, a burst can contain multiple TDM service connections. The burst length depends on the rate of a WDM link. For example, in the 10 Gbps optical networks, the max burst length of the TDM synchronous service is 156K byte (or 125 μs) that corresponds to the total service produced by 200 DS-3 connections.

Figure 2A:
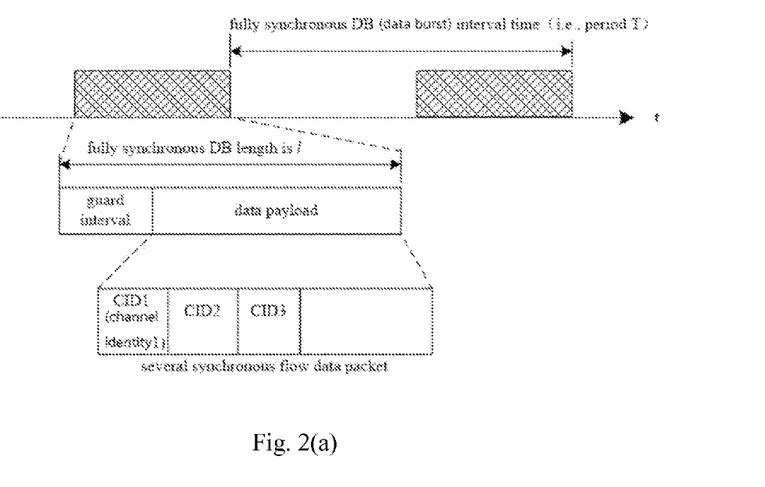
FIG. 2(a) is a format of a fully-synchronous DB.
Figure 2B:
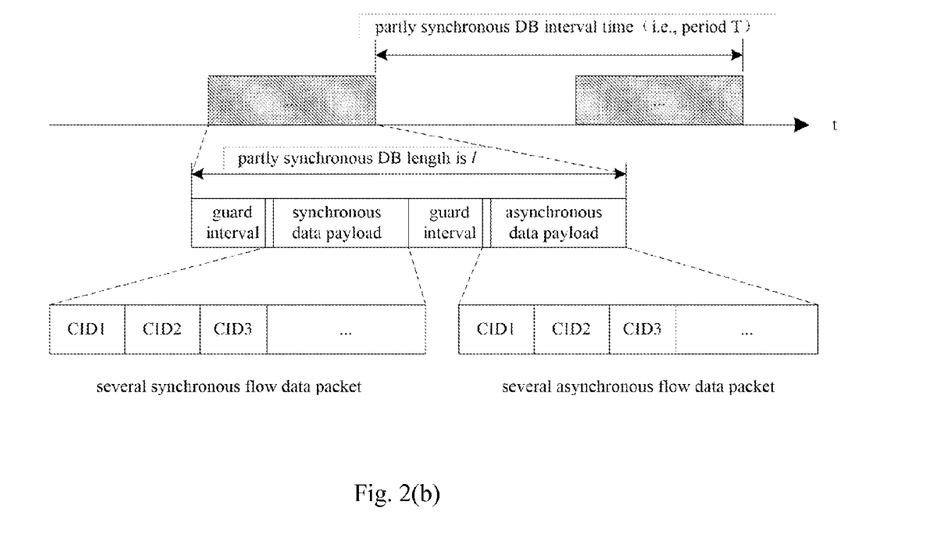
FIG. 2(b) is a format of a hybrid synchronous/asynchronous DB.

As shown in FIG. 2, every service connection of the synchronous burst can be marked by the channel identity (CID) of the GFP frame extensive head. The CID is 8 bit, so a synchronous DB can maximally bear 256 TDM synchronous services. The synchronous burst length is $T_B$ and the guard interval $T_G$ is about 50 ns. A synchronous burst contains frames of one or multiple synchronous service connections. Every frame comprises a synchronous field about 100 ns and a GFP-F about $T_F$. In the GFP-F frame, the overhead $T_O$ is about 50 ns, and the payload length is about $T_P$. The rate of $T_P$ changes by the data rate of the synchronous service flow. Fox example, when the synchronous service is DS-3 service, $T_P$ is not greater than 500 ns. By the above encapsulation paradigm, F bit synchronous service can be encapsulated in N frame:

$$N = \left\lceil \frac{F}{R \cdot T_P} \right\rceil,$$

where R is channel transmission rate.

The synchronous service rate (i.e., bandwidth granularity) has a large effect on the network transmission efficiency. If the payload $T_P$ is short, then $T_B$ is short and the network transmission efficiency is low. For example, a service of DS1 granularity has only 24 byte every 125 μs. According to the GFP-F encapsulation paradigm, the transmission efficiency of the burst frame is low and is only 4%. Therefore, the burst frame cannot be set the fixed time, and the duration of $T_P$ can be changed by the input synchronous service load to improve the efficient payload ratio of the burst frame.

(2) The definition and format design of R-BCP and T-BCP.

Figure 3A:
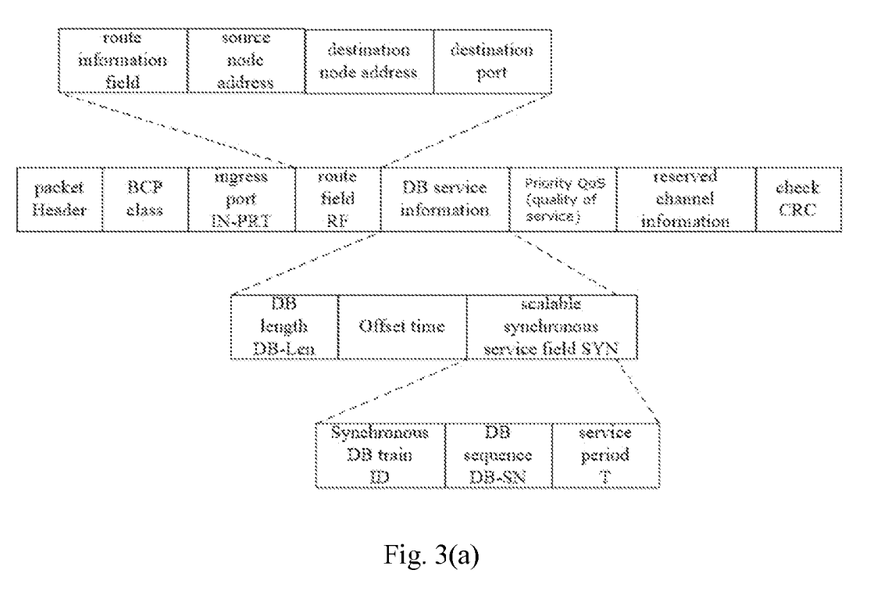
FIG. 3(a) is a format of R-BCP.

As shown in FIG. 3a, the format of R-BCP contains the header marking the R-BCP boundary and the R-BCP type field marking various BCPs of OBS networks such as R-BCP of asynchronous DB, R-BCP and T-BCP of fully-synchronous DB and hybrid synchronous/asynchronous DB. The field indicates the BCP class and process method. The input port (IN-PRT) indicates the port at which a BCP is received. The route field (RF) records the source destination path to confirm the message path is the same as the BCP path by end-to-end paradigm.

R-BCP contains an important field that is the DB service information field. The field comprises DB length (DB-Len), offset time and scalable synchronous service field. Offset time, indicating the following DB arrival time, and DB length field are used to reserve resource for DB. When the DB is synchronous, the BCP is expanded to contain the synchronous service field including the period information. In the DB service information field, period is used to determine the period of the synchronous service connection. Period, DB length field and offset time field are used to reserve resource for synchronous DB every period T. Synchronous burst train ID and burst sequence are used to mark the synchronous DB train and the DB of the synchronous DB train. For the asynchronous DB, it only need reserve resource one time and don't need periodically reserve resource. Reserved wavelength information indicates which wavelength is reserved to transmit burst.

Figure 3B:
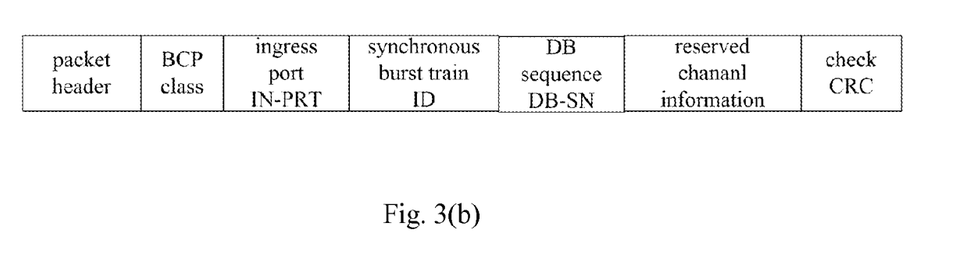
FIG. 3(b) is a format of T-BCP.

A T-BCP of synchronous DB prolongs the resource reserved period for all subsequent DBs of a synchronous DB train. Its format is shown as FIG. 3b. A T-BCP can trace the R-BCP of its corresponding synchronous DB train only depending on the sequence and ID of its corresponding synchronous DB, and it don't need the information such as DB length, period and path field to be added because the information is already carried in the R-BCP of its corresponding synchronous DB.

Figure 4:
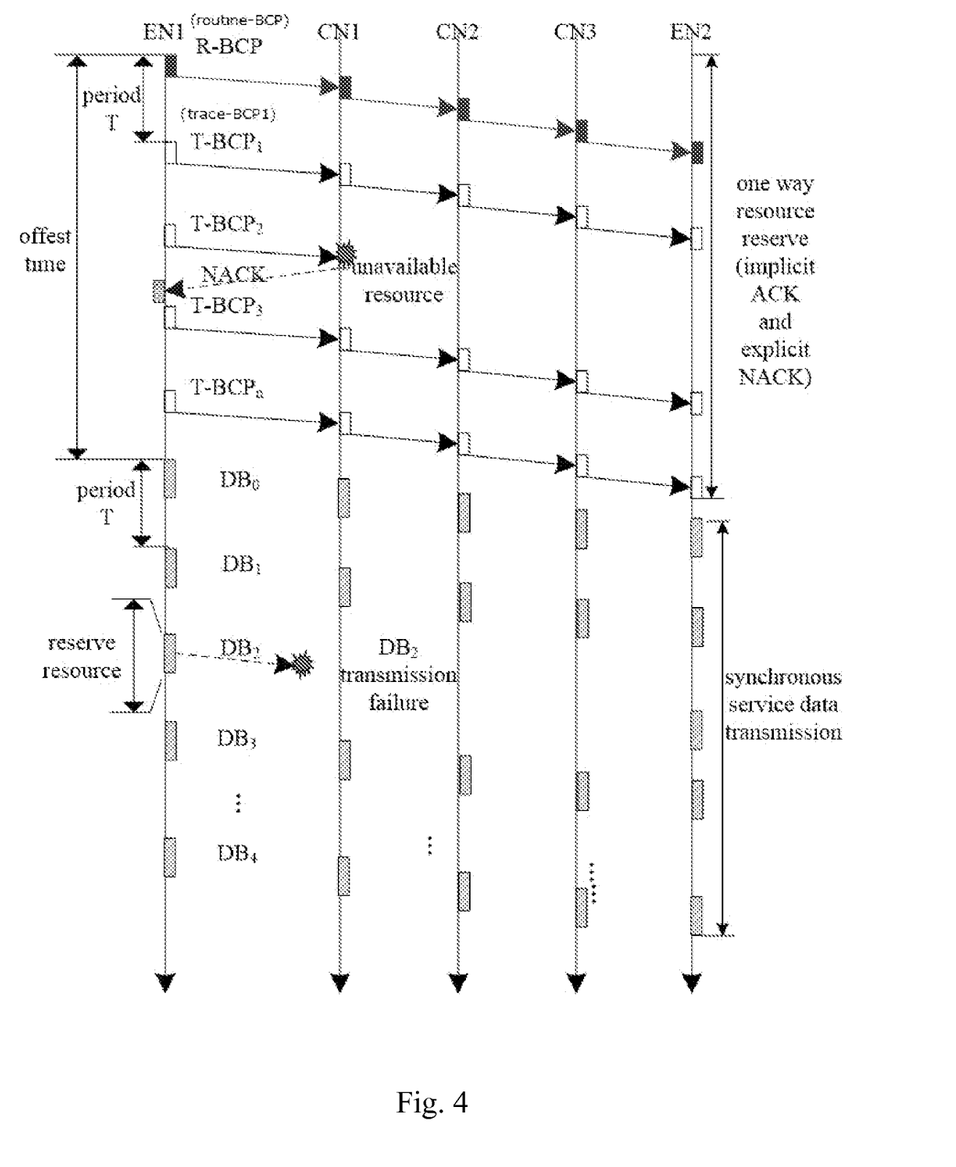
FIG. 4 is an example of the resource reservation protocol for the synchronous service DB.

(3) The realization of the resource reservation protocol with multi-servers convergence transmission The realization of the resource reservation protocol with multi-servers convergence transmission is shown in FIG. 4 by the example of synchronous service optical burst.

It is assumed that the synchronous DB length is l, the synchronous service period is T, and the first DB of the synchronous DB train arrives at a node at t1 moment (EN 1~2 or CN 1~3 of FIG. 4). Accordingly, the control panel reserves the resource from t1+offset-time at the downstream node by the delay reservation, and releases the resource till t1+offset-time+l. If the reservation is successful, then R-BCP is sent to the downstream node of the downstream node to continue to reserve the resource and the reservation process continues to the destination node. If the reservation process fails, a NACK failure message is sent to the ingress node to inform that the ingress node restart the reservation process and interrupt the transmission of DB. If the process is successful, the DB is sent successfully. It is noted that the OBS network configuration of the wavelength converter and optical buffer is not taken into account and only continual wavelength is taken into account.

The resource, which is reserved for the first DB at every node by the R-BCP of the synchronous DB, is not released immediately after use. But to keep the reserved resource for the subsequent DB of the DB train, it waits whether or not T-BCP of the DB train arrives.

The concrete process that the T-BCP prolongs the previously reserved resource is introduced as follow. An ingress node need not send extra R-BCP of subsequent DB of the burst train to initiate the resource reservation again. The ingress node sends a T-BCP of the synchronous DB to inform the correspond nodes that the burst train has subsequent DBs. When a certain node receives a T-BCP at ti moment, it immediately finds whether it had already received a R-BCP of the same burst train. If a R-BCP is received and the resource is not released, then the resource in the period from ti+offset-time to ti+offset-time+l is kept reservation, where ti=t1+nT and n is natural number that is greater than 1. If the R-BCP is not found or the reserved resource is released, then a NACK message is sent to the ingress node to inform the ingress node that the DB of burst train is sent unsuccessfully and the resource reservation is reinitiated.

(4) The preemption policy of resolving resource contention

Figure 5:
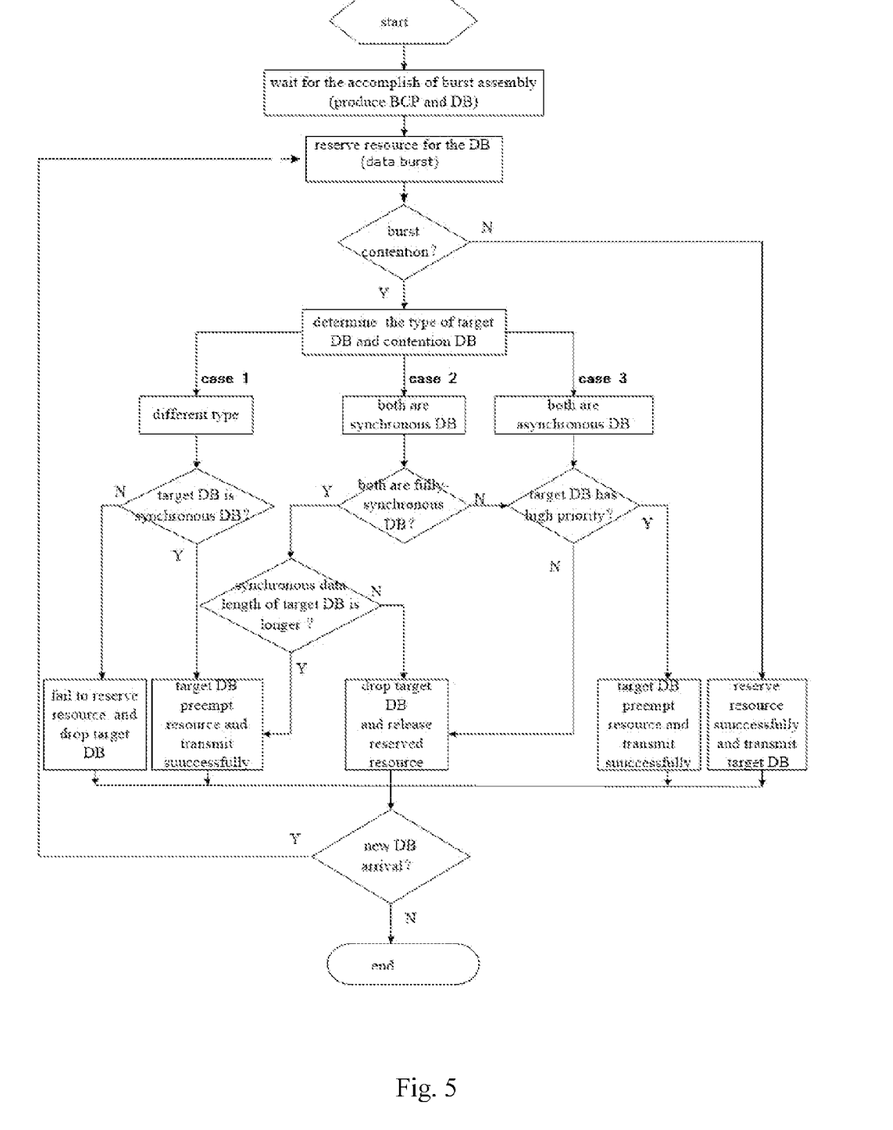
FIG. 5 is a working flowchart of the wavelength channel reservation with the multi-services convergence transmission and preemption.

In the OBS networks, resource contention is inevitable in the data transmission. How to differentially preempt resource for different class DB is very important signification to ensure the QoS of various class and keep the transmission charter of synchronous service such as period and low delay jitter. As shown in FIG. 5, the problem can be resolved by presetting a preemption policy. In general, the synchronous service is real-time service and it has higher preemption priority. Accordingly, the priority of fully-synchronous DB is highest, the hybrid synchronous/asynchronous DB is second, and fully-asynchronous DB is lowest. Therefore, when different class services have resource contention, the preemption operates as follows. The synchronous DB can preempt the resource of the asynchronous DB. For the two synchronous DBs, the long DB can preempt the short DB. High priority DB preempts low priority DB for the two fully synchronous DBs or asynchronous DBs.

The implement method of OBS network resource reservation protocol with multi-services convergence proposed by the present invention can efficiently bear the synchronous and asynchronous service. Based on classical OBS networks, the method only need add a few modules such as the periodical schedule module of the edge nodes and timer module to realize the object that a single network bears multi-services. And it can suit any network topology and network scale. It can be compatible with OBS contention resolution method such as the wavelength converter, optical buffer and deflection route, and has very nice scalability.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following

What is claimed is:

1. An implement method of resource reservation protocol with multi-services convergence transmission for optical burst switching networks, comprising the steps of:
   (A) dividing user service data arriving at optical burst switching (OBS) network ingress nodes into two categories: a synchronous service and an asynchronous service, wherein the user service data are assembled into three classes of data burst (DB), namely, a fully synchronous DB, a hybrid synchronous/asynchronous DB, and a fully asynchronous DB, wherein the fully synchronous DB and the hybrid synchronous/asynchronous DB are collectively referred to as a synchronous DB;
   (B) defining and format-designing a routine burst control packet (R-BCP), a trace burst control packet (T-BCP) for implicitly notifying network nodes that a previously transmitted synchronous service flow has subsequent bursts;

(C) at the edge nodes, making a generalized optical burst assembly supporting a multi-services convergence transmission comprises the steps of:
(C1) determining a DB assembly manner; and
(C2) creating BCPs comprising the steps of creating R-BCP and T-BCP for implicitly notifying network nodes that the previously transmitted synchronous service flow has subsequent bursts;
(D) at the edge node, scheduling different class optical DBs by QoS differentiation;
(E) making a resource reservation protocol with multi-services convergence transmission; and
(F) determining a policy for a resource competition among different class services.

2. The method, as recited in claim 1, wherein in step (C2), when best-effort service data are assembled into a fully-asynchronous DB, the assembly algorithm is a classic algorithm, when a DB is assembled, a R-BCP is created, wherein when TDM/PWE service data is assembled into a fully-synchronous DB or hybrid synchronous/asynchronous DB, the assembled DB has a period in order to keep transmission characters of the synchronous service, wherein logically a series of synchronous DBs that have the same destination, period and QoS character are referred to as a synchronous DB train, wherein in order to reduce an overhead of BCP process at the OBS core nodes, the assembly paradigm of the synchronous service is changed to create a R-BCP and multiple T-BCP for a synchronous DB train.

3. The method, as recited in claim 2, wherein in step (D), the asynchronous DBs are individually scheduled by the classic algorithm, and for the synchronous DBs, a synchronous DB train is wholly scheduled by their period.

4. The method, as recited in claim 3, wherein in step (F), the synchronous DB can preempt the resource of the asynchronous DB, for two synchronous DBs, a long DB can preempt a short DB, for two fully-synchronous DBs or two asynchronous DBs, a high priority DB can preempt a low priority DB.

5. The method, as recited in claim 2, wherein in step (F), the synchronous DB can preempt the resource of the asynchronous DB, for two synchronous DBs, a long DB can preempt a short DB, for two fully-synchronous DBs or two asynchronous DBs, a high priority DB can preempt a low priority DB.

6. The method, as recited in claim 2, wherein in step (E), for the synchronous DB, an edge node sends a BCP that reserves the resource for a first DB of a corresponding DB train at the nodes within a transmission path, and in a service duration, the edge node periodically creates T-BCPs for synchronous DBs and sends them into the network, wherein after the resource reserved by the BCP of a synchronous DB train at the core node is used, the resource reserved by the BCP did not be released immediately and a timer is started to delay the release, wherein if the timer is timeout and the core node did not receive the T-BCP of a synchronous DB that has the same id as the synchronous DB whose resource is already reserved, the reserved resource is released, otherwise, when the core node receives a T-BCP, the reserved resource keeps alive, wherein the asynchronous DB is referred to as a special synchronous DB train to reserve the resource, a train length of the DB train is short and the number of the DB train is one.

7. The method, as recited in claim 6, wherein in step (F), the synchronous DB can preempt the resource of the asynchronous DB, for two synchronous DBs, a long DB can preempt a short DB, for two fully-synchronous DBs or two asynchronous DBs, a high priority DB can preempt a low priority DB.

8. The method, as recited in claim 1, wherein in step (D), the asynchronous DBs are individually scheduled by a classic algorithm, and for the synchronous DBs, a synchronous DB train is wholly scheduled by their period.

9. The method, as recited in claim 8, wherein in step (E), for the synchronous DB, an edge node sends a BCP that reserves the resource for a first DB of a corresponding DB train at the nodes within a transmission path, and in a service duration, the edge node periodically creates T-BCPs for synchronous DBs and sends them into the network, wherein after the resource reserved by the BCP of a synchronous DB train at the core node is used, the resource reserved by the BCP did not be released immediately and a timer is started to delay the release, wherein if the timer is timeout and the core node did not receive the T-BCP of a synchronous DB that has the same id as the synchronous DB whose resource is already reserved, the reserved resource is released, otherwise, when the core node receives a T-BCP, the reserved resource keeps alive, wherein the asynchronous DB is referred to as a special synchronous DB train to reserve the resource, a train length of the DB train is short and the number of the DB train is one.

10. The method, as recited in claim 9, wherein in step (F), the synchronous DB can preempt the resource of the asynchronous DB, for two synchronous DBs, a long DB can preempt a short DB, for two fully-synchronous DBs or two asynchronous DBs, a high priority DB can preempt a low priority DB.

11. The method, as recited in claim 8, wherein in step (F), the synchronous DB can preempt the resource of the asynchronous DB, for two synchronous DBs, a long DB can preempt a short DB, for two fully-synchronous DBs or two asynchronous DBs, a high priority DB can preempt a low priority DB.

12. The method, as recited in claim 1, wherein in step (E), for the synchronous DB, an edge node sends a BCP that reserves the resource for a first DB of a corresponding DB train at the nodes within a transmission path, and in a service duration, the edge node periodically creates T-BCPs for synchronous DBs and sends them into the network, wherein after the resource reserved by the BCP of a synchronous DB train at the core node is used, the resource reserved by the BCP did not be released immediately and a timer is started to delay the release, wherein if the timer is timeout and the core node did not receive the T-BCP of a synchronous DB that has the same id as the synchronous DB whose resource is already reserved, the reserved resource is released, otherwise, when the core node receives a T-BCP, the reserved resource keeps alive, wherein the asynchronous DB is referred to as a special synchronous DB train to reserve the resource, a train length of the DB train is short and the number of the DB train is one.

13. The method, as recited in claim 3, wherein in step (E), for the synchronous DB, an edge node sends a BCP that reserves the resource for a first DB of a corresponding DB train at the nodes within a transmission path, and in a service duration, the edge node periodically creates T-BCPs for synchronous DBs and sends them into the network, wherein after the resource reserved by the BCP of a synchronous DB train at the core node is used, the resource reserved by the BCP did not be released immediately and a timer is started to delay the release, wherein if the timer is timeout and the core node did not receive the T-BCP of a synchronous DB that has the same id as the synchronous DB whose resource is already reserved, the reserved resource is released, otherwise, when the core node receives a T-BCP, the reserved resource keeps alive, wherein the asynchronous DB is referred to as a special synchronous DB train to reserve the resource, a train length of the DB train is short and the number of the DB train is one.

14. The method, as recited in claim 13, wherein in step (F), the synchronous DB can preempt the resource of the asynchronous DB, for two synchronous DBs, a long DB can preempt a short DB, for two fully-synchronous DBs or two asynchronous DBs, a high priority DB can preempt a low priority DB.

15. The method, as recited in claim 12, wherein in step (F), the synchronous DB can preempt the resource of the asynchronous DB, for two synchronous DBs, a long DB can preempt a short DB, for two fully-synchronous DBs or two asynchronous DBs, a high priority DB can preempt a low priority DB.

16. The method, as recited in claim 1, wherein in step (F), the synchronous DB can preempt the resource of the asynchronous DB, for two synchronous DBs, a long DB can preempt a short DB, for two fully-synchronous DBs or two asynchronous DBs, a high priority DB can preempt a low priority DB.

\* \* \* \* \*